(12) United States Patent
Yang et al.

(10) Patent No.: US 6,990,535 B1
(45) Date of Patent: Jan. 24, 2006

(54) DEVICE AND METHOD FOR MULTI-PORTED, SINGLE BUS-MASTERING DATA BUFFER MANAGEMENT

(75) Inventors: Li-Jau (Steven) Yang, San Jose, CA (US); Richard Traber, Fremont, CA (US)

(73) Assignee: 3Com Corporation, Marlborough, MA (US)

( * ) Notice: Subject to any disclaimer, the term of this patent is extended or adjusted under 35 U.S.C. 154(b) by 1195 days.

(21) Appl. No.: 09/793,363

(22) Filed: Feb. 26, 2001

(51) Int. Cl.
*G06F 12/00* (2006.01)

(52) U.S. Cl. .................. 710/3; 710/9; 710/26; 710/52; 710/309; 709/236; 370/379; 370/382

(58) Field of Classification Search .................. 710/3, 710/9, 26, 52, 309; 709/236; 370/379, 382
See application file for complete search history.

(56) References Cited

U.S. PATENT DOCUMENTS 6,138,186 A * 10/2000 Simms et al. ................ 710/52
6,151,644 A * 11/2000 Wu .............................. 710/52
6,708,234 B2 * 3/2004 Moteki et al. ................ 710/22

* cited by examiner

*Primary Examiner*—Nabber Moazzami
*Assistant Examiner*—Ngoc V. Dinh
(74) *Attorney, Agent, or Firm*—Jackson & Co., LLP

(57) ABSTRACT

An architecture, method, and apparatus for managing a data buffer (Data Buffer Management DBM). A data buffer within the DBM is an unified linear memory space, and is divided into numbered physical pages with a predetermined page size. A memory map translates logical address spaces for storing/reading DBM transferred data to the physical address spaces. Each packet to be written into DBM is assigned a frame number or frame handler; thereafter, that frame number will be passed by the original owner (a device attached to the data buffer) to different processes for reading out and/or modifying the associated packet or packet data. Frame number assignment is done prior to actual data transfer by request of the data owner. The frame number request is done prior to moving data from the owner's local memory into the DBM's data buffer. Frame number is allocated dynamically by the DBM. Frame number requests, transfer of frame numbers and other admin functions of the transfer are carried out over an M bus and the DMA transfer of data is performed on an F bus, each of which are coupled to the DBM and the attached devices.

24 Claims, 13 Drawing Sheets

| OSI | | | | | | TCP/IP |
|---|---|---|---|---|---|---|
| Application | SMB | | | | | Application |
| Presentation | | | | | | |
| Session | NetBIOS | | NetBIOS | NetBIOS | | |
| Transport | IPX[1] | NetBEUI | DECnet | TCP&UDP | TCP/UDP | |
| Network | | | | IP | IP | |
| Link | 802.2, 802.3, 802.5 | 802.2 | Ethernet V2 | Ethernet V2 | Ethernet or others | |
| | | 802.3, 802.5 | | | | |
| Physical | | | | | | |

Fig. 2

DBM Block Level Architecture with attached devices

Logical Address Format

Memory Map and Formation of Physical Address

Interface Signals between each device and DBM

F_BUS Write Timing Diagram

F_BUS Read Timing Diagram

DEVICE AND METHOD FOR MULTI-PORTED, SINGLE BUS-MASTERING DATA BUFFER MANAGEMENT

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of Invention

The present invention relates to network communications. The present invention is more particularly related to buffers and the processes of saving and retrieving data from the buffer. The present invention is still more particularly related to accelerating packet buffer operations for a high speed network interface device.

2. Discussion of Background

Although this specification presumes familiarity with the general concepts, protocols, and devices commonly used in LAN networking applications, each of which have corresponding standards that are publicly available, (e.g., the IEEE 802.3 standard (Ethernet)), a brief overview is provided.

General Network Topology

Local area networks (LANs) are arrangements of various hardware and software elements that operate together to allow a number of digital devices to exchange data within the LAN and also may include internet connections to external wide area networks (WANs). FIG. 1 is a diagram representing a modern LAN 100 comprised of one to many Hosts or End Systems (ESs) such as hosts 1 . . . n that are responsible for data transmission throughout the LAN. The ESs may be familiar end-user data processing equipment such as personal computers, workstations, and printers and additionally may be digital devices such as digital telephones or real-time video displays. Different types of ESs can operate together on the same LAN. In FIG. 1, the hosts 1 . . . n are on a ring type LAN having a server/bridge/router device 130, that may also be referred to as an Intermediate System (IS), that serves various network functions for the LAN 100, and administers each of a bridge to an attached LAN 160 and a router to a Wide Area Network (WAN) 190. However, modern networks may be composed of any number of hosts, bridges, switches, hubs, routers, and other network devices, and may be configured as any one or more of ring, star, and other configurations.

Packets

In a LAN such as 100, data is generally transmitted between ESs as independent packets, with each packet containing a header having at least a destination address specifying an ultimate destination and generally also having a source address and other transmission information such as transmission priority. Packets are generally formatted according to a particular protocol and contain a protocol identifier of that protocol. Packets may be encased in other packets.

Layers

Modern communication standards, such as the TCP/IP Suite and the IEEE 802 standards, organize the tasks necessary for data communication into layers. At different layers, data is viewed and organized differently, different protocols are followed, different packets are defined and different physical devices and software modules handle the data traffic. FIG. 2 illustrates various examples of layered network standards having a number of layers. Corresponding levels of the various network standards are shown adjacent to each other and the OSI layers, which are referred to herein as: the Physical Layer, the Data Link Layer, the Routing Layer, the Transport Layer, the Session Layer, the Presentation Layer and the Application Layer, are also shown for reference. Please note the TCP/IP protocol layers shown.

Generally, when an ES is communicating over a network using a layered protocol, a different software module may be running on the ES at each of the different layers in order to handle network functions at that layer.

Drivers and Adapters

Each of the ISs and ESs in FIG. 1 includes one or more adapters and a set of drivers. An adapter generally includes circuitry and connectors for communication over a segment and translates data from the digital form used by the computer circuitry in the IS or ES into a form that may be transmitted over the segment, which may be electrical signals, optical signals, radio waves, etc. A driver is a set of instructions resident on a device that allows the device to accomplish various tasks as defined by different network protocols. Drivers are generally software programs stored on the ISs or ESs in a manner that allows the drivers to be modified without modifying the IS or ES hardware.

NIC Driver

The lowest layer adapter software operating in one type of network ES is generally referred to as a NIC (Network Interface Card) driver. A NIC driver is layer 2 software designed to be tightly coupled to and integrated with the adapter hardware at the adapter interface (layer 1) and is also designed to provide a standardized interface between layer 2 and 3. Ideally, NIC drivers are small and are designed so that even in an ES with a large amount of installed network software, new adapter hardware can be substituted with a new NIC driver, and all other ES software can continue to access the network without modification.

NIC drivers communicate through one of several available NIC driver interfaces to higher layer network protocols. Examples of NIC driver interface specifications are NDIS (Network Driver Interface Specification developed by Microsoft and 3Com) and ODI (Open Data-Link Interface developed by Apple Computer and Novell).

Protocols

Ethernet is logical communication protocol that permits multiple devices to talk to each other over a variety of physical media. The Ethernet protocol is described in the IEEE 802.3 standard and utilizes a protocol called Carrier Sense Multiple Access with Collision Detection (CSMA/CD). CSMA/CD is a broadcast mechanism where one station speaks while all others listen. When two stations try to speak at the same time, a collision takes place. With CSMA/CD, both stations detect the collision, back off, and retry later.

A simple form of an Ethernet local area network (LAN) is illustrated by an Ethernet LAN in FIG. 3. A LAN adapter 310 provides the interface between a host 300 and an Ethernet transceiver 320, also called a medium attachment unit (MAU). The MAU 320 provides a physical interface to a LAN medium 330. An interface between the LAN adapter 310 and transceiver 320 is the adapter unit interface (AUI) 315. The Ethernet (LAN) medium 330 is normally a cable. The type of cable depends on the type of Ethernet. In many cases, a single electronics board combines the LAN adapter 310 and the transceiver 320 as LAN Adapter 340.

Table 1 provides the Ethernet/IEEE802 Packet Format:

TABLE 1

| MAC header | IP header | TCP header | Payload | CRC |
|---|---|---|---|---|

The Ethernet protocol runs on top of and therefore contains the TCP/IP protocol. The Media Access Control (MAC) header contains a MAC number that is a unique address of a host or other device connected to the LAN (NIC, for example). Although Ethernet is a popular protocol, other protocols are also in common use.

The TCP/IP (Transmission Control Protocol/Internet Protocol) protocol is a suite of protocols and is the standard for connection based data transmission and services across the Internet. The Transmission Control Protocol manages the packaging of data into packets that get routed on different paths over the Internet and reassembled at their destination. The Internet Protocol handles the address part of each data packet so that it is routed to the correct destination.

TCP re-assembly is the task performed for identifying and routing an incoming packet received at a host. Traditionally, the tasks of TCP re-assembly have been performed either by a host CPU or an embedded processor. In either case, to carry out this task, the CPU has to first identify which TCP connection the incoming packets belong to. It then extracts certain fields off of TCP/IP headers of the incoming packets to identify the sequence of the received payload within a current segment data file. To carry out these tasks, the CPU, or embedded processor, accesses a packet data buffer to retrieve packet header data and process the TCP/IP headers as required. In addition, outgoing packets may also be processed using a Transmission (Tx) packet buffer.

A typical packet buffer is organized in a conventional memory space. Table 2 provides an example organization of conventional memory for an n-byte, word, or double word set of memory locations.

TABLE 2

| byte 0 |
|---|
| byte 1 |
| byte 2 |
| byte 3 |
| byte 4 |
| byte 5 |
| . |
| . |
| . |
| byte n-2 |
| byte n-1 |

In today's high speed networking such as Gigabit Ethernet or 10 Gigabit Ethernet, the overall throughput or performance suffers because packets cannot be processed as quickly as needed to keep up with the incoming data rates. Among other causes, a large amount of time is spent storing and accessing packets to/from the packet buffers and any improvements in speed or efficiency of packet buffer storage/retrieval is needed.

SUMMARY OF THE INVENTION

The present invention provides a new architecture, method, and apparatus for managing a data buffer (Data Buffer Management DBM), and is particularly applicable to managing packet data in a high performance networking environment. The data buffer within the DBM is an unified linear memory space, and is divided into numbered physical pages with a predetermined page size. Each packet to be written into DBM is assigned a frame number or frame handler; thereafter, that frame number will be passed by the original owner (a device attached to the data buffer) to different processes for reading out and/or modifying the packet or packet data associated with the assigned frame number. Frame number assignment is done prior to actual data transfer. For example, for packet data to be written into DBM, the data transfer DMA (an attached device that is to transfer the packet data to the DBM) needs to request a frame number from DBM before it can move data from its local memory into DBM's data buffer. Frame number is allocated dynamically by DBM's control logic to the requester. Frame number requests, transfer of frame numbers and other administrative functions of the transfer are carried out over an M bus and the DMA transfer of data is performed on an F bus, each of which are coupled to the DBM and the attached devices.

The present invention is embodied as a buffer memory device, comprising a packet buffer divided into a set of numbered physical pages, a two-dimensional memory map (indexed by frame number as row and logical page number as column) configured as logical storage locations of said buffer memory device, each logical storage location stores a physical page number of said packet buffer, a control device having an interface to at least one attached device configured to, communicate a read or write protocol between the buffer memory and the attached devices, and communicate data written/read to/from the attached devices, an arbitrator configured to arbitrate between requests of the attached devices, and a store retrieval mechanism configured to store data written to the buffer memory by a granted write operation of an attached device and read data from the buffer memory according to a granted read operation of an attached device, wherein said store/retrieval mechanism stores and retrieves data to/from a physical page in said packet buffer stored at a logical location in said memory map, a free page queue configured to store a pool of free physical page numbers and a free frame number queue configured to store a pool of free frame numbers.

The present invention includes a method of writing to a data buffer comprising a packet buffer divided into a set of numbered physical pages, a two-dimensional memory map (indexed by frame number as row and logical page number as column) configured as logical storage locations of said buffer memory device, each logical storage location stores a physical page number of said packet buffer, and an interface to at least one attached device, comprising the steps of awarding an arbitration among requests of the attached devices, and allocating a physical page (if the winning request is write operation) from said free page queue pool in a second clock cycle, saving the allocated physical page into the indexed (by frame number and logical page number) logical location of said memory map, and asserting a grant signal to the first attached device, and in a transfer set of clock cycles, accepting data from the attached arbitration-winner device to the data buffer. And, a method of reading from a data buffer comprising a packet buffer divided into a set of numbered physical pages, a two-dimensional memory map (indexed by frame number as row and logical page number as column) configured as logical storage locations of said buffer memory device, each logical storage location stores a physical page number of said packet buffer, and an interface to at least one attached device, comprising the steps of arbitrating among requests from the attached devices, translating a logical address to a physical address of a read command word that has been successfully arbitrated, reading data bytes from the physical address, and sending the read data bytes to the attached device whose command word was successfully arbitrated.

Both the device and method may be conveniently implemented on a general purpose computer, or networked computers, and the results may be displayed on an output device connected to any of the general purpose, networked computers, or transmitted to a remote device for output or display.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein:

FIG. 2 is an illustration of various examples of layered network standards;

DESCRIPTION OF THE PREFERRED EMBODIMENTS

The present invention is a new memory management scheme, called a Data Buffer Management or DBM that performs buffer operations for packet data in high performance networking environments. Each packet to be written into DBM is assigned a frame number or frame handler; thereafter, that frame number will be passed by the original owner to different process for reading out/or modifying the associated packet data. Frame number assignment is done prior to actual data transfer. For example, for a packet data to be written into DBM, the device attached to the DBM that is to transfer the packet data (e.g., a data transfer DMA) requests a frame number from the DBM prior to initiating the transfer of data.

Figure 1:
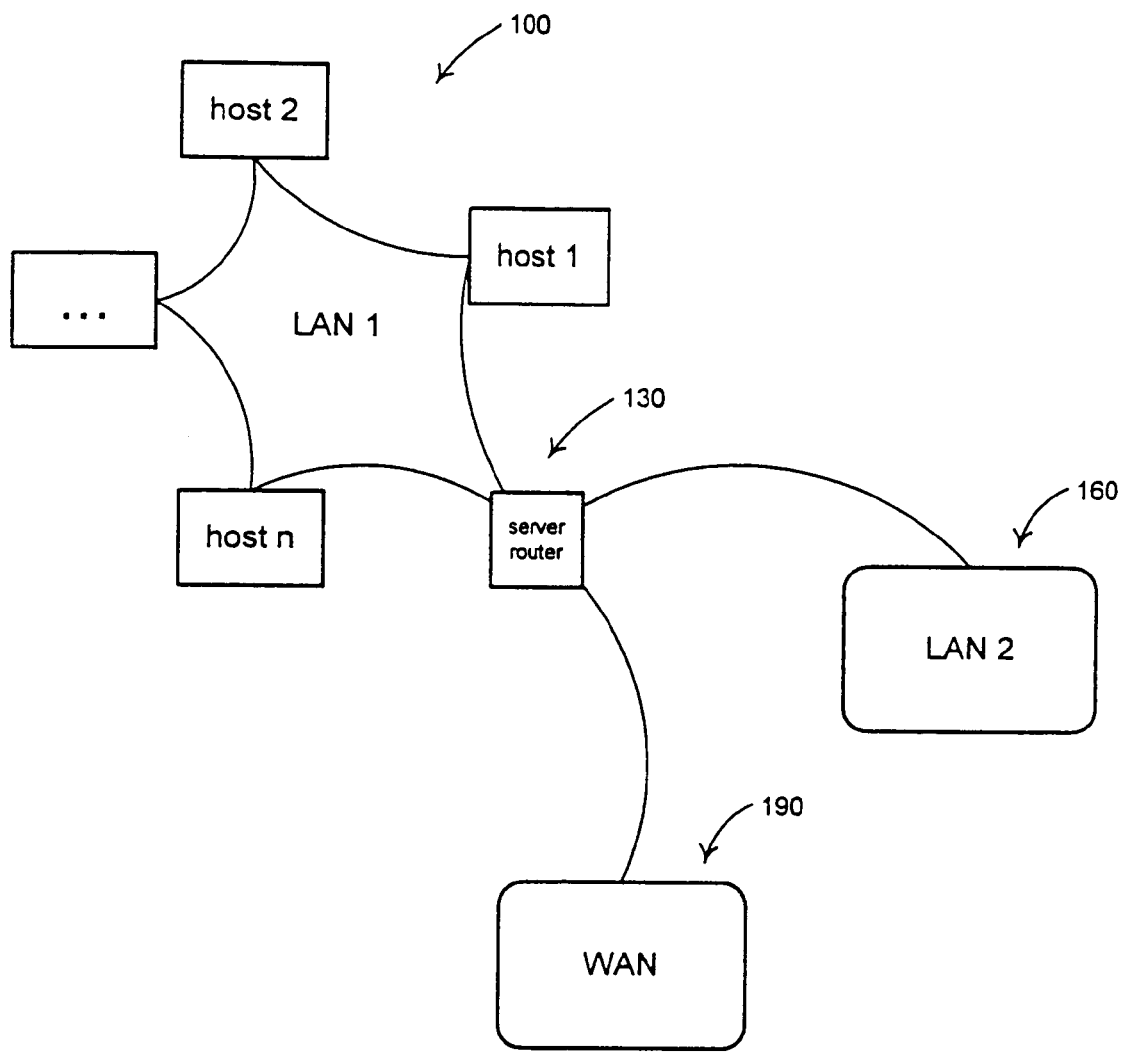
FIG. 1 is a block diagram representing a modern LAN.
Figure 3:
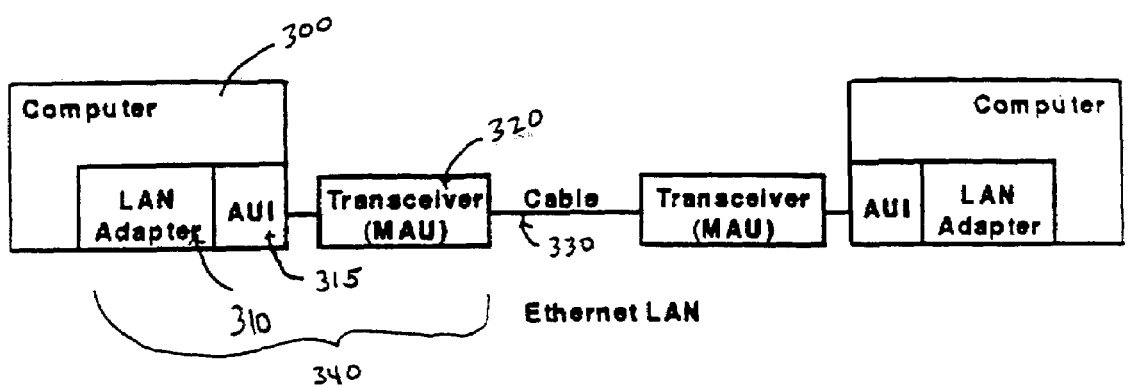
FIG. 3 is a block diagram of example components of an Ethernet LAN.
Figure 4A:
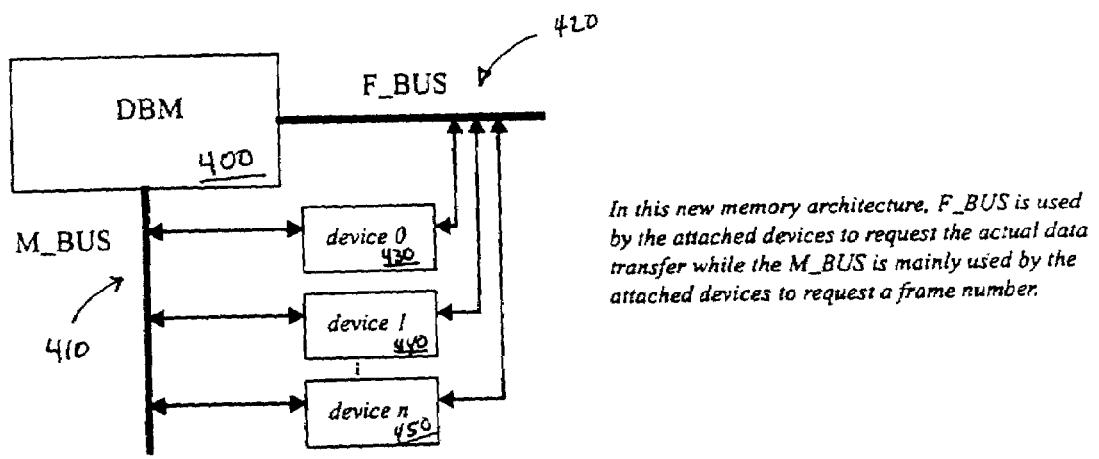
FIG. 4A is a block diagram of an architecture of a DBM and a bus structure according to an embodiment of the present invention.

Referring again to the drawings, wherein like reference numerals designate identical or corresponding parts, and more particularly to FIG. 4A thereof, there is illustrated a block diagram of an architecture of a DBM 400 and a bus structure according to an embodiment of the present invention. The bus structure includes an M_BUS 410 and F_BUS 420, each of which are coupled to the DBM 400 and at least one attached device (attached device 0 430, device 1 440, and device n 450 are shown).

Requests for writing and reading data (to/from the DBM) from any of the attached devices are made through the F_BUS 410. For writing requests, before the requesting device can move data from its local memory into a data buffer of the DBM, the requesting device requests and receives a frame number 490 from the DBM. Requests for frame numbers are made on the M_BUS 410.

Figure 4B:
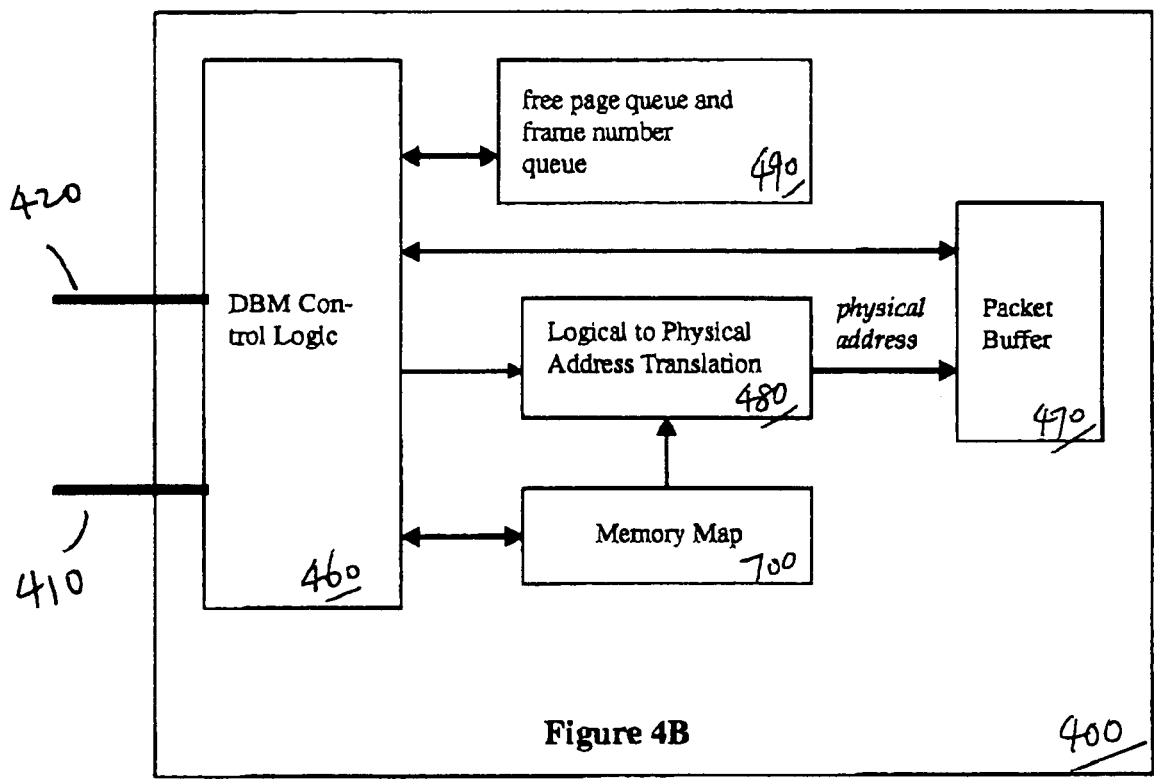
FIG. 4B is a block diagram of example internal components of a DBM according to the present invention.

FIG. 4B is a block diagram of example internal components of a DBM according to the present invention. Frame numbers are allocated dynamically by control logic 460 within the DBM. A data buffer within the DBM is an unified linear memory space, packet buffer 470, and, in one embodiment, is divided into numbered physical pages with a page size of 128 bytes. 128 bytes was selected for page size as an efficient amount of storage for a page. However, other page sizes may be utilized. Table 3 provides an example memory map for a packet buffer according to an embodiment of the present invention.

TABLE 3

| page 0   | — — | — — | — — |
| page 1   | — — | — — | — — |
| page 2   | — — | — — | — — |
| page 3   | — — | — — | — — |
| page 4   | — — | — — | — — |
| .        |     |     |     |
| .        |     |     |     |
| .        |     |     |     |
| page m-2 | — — | — — | — — |
| page m-1 | — — | — — | — — |
|          | 127 |     | 0   |
|          |     |     | ← page offset |

In this new memory architecture, data transfer is performed through an F_BUS 420 (see FIGS. 4A & 4B). The F_BUS is an uncomplicated and highly efficient bus protocol. The F_BUS is a single bus-master architecture, but supports multiple slave devices. The F_BUS supports variable burst size, and has a maximum transfer size equivalent to the physical page size of the packet buffer 470. In the embodiment described above, a max of 128 bytes are transferred in either read (data flows from data buffer to the requesting agent) or write (data flows from the requesting agent to data buffer) operation. Preferably, the F_BUS includes a data bus that is 128 bits wide.

Figure 5:
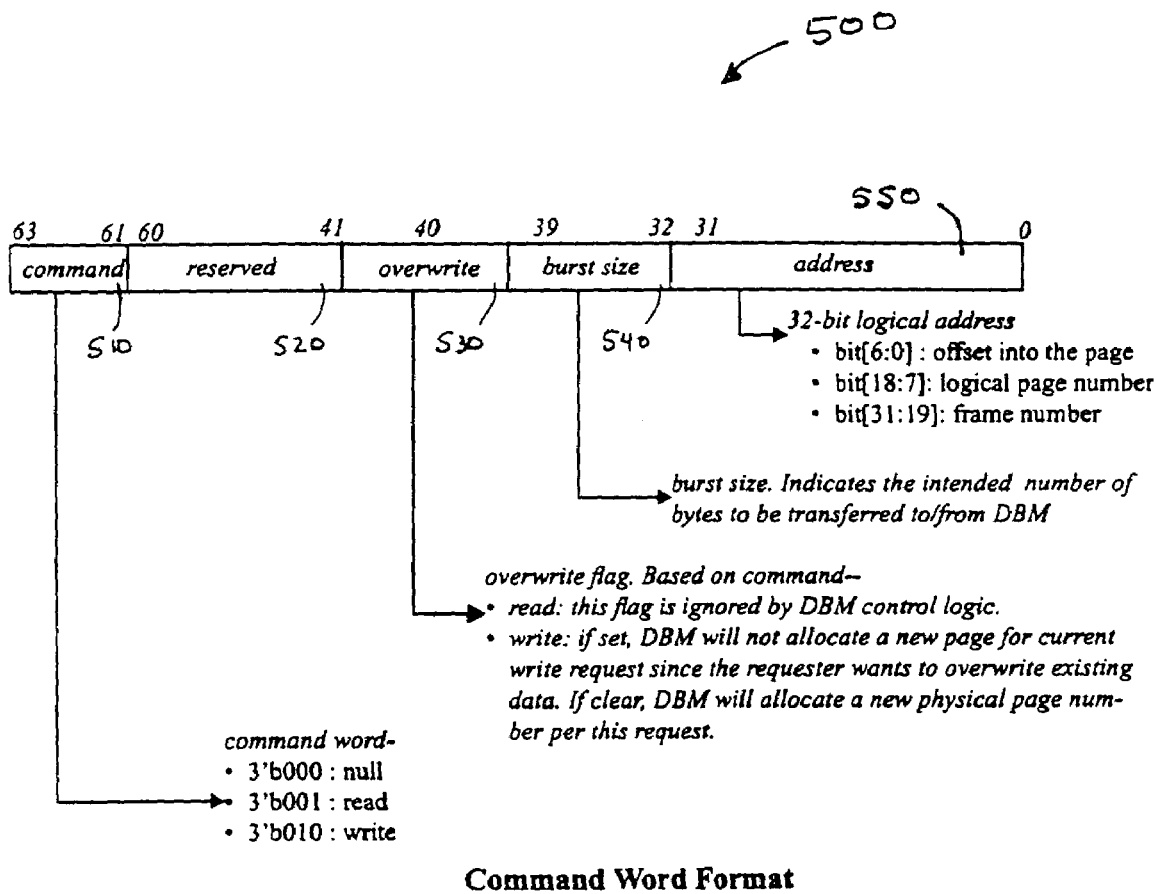
FIG. 5 is an example command word format according to an embodiment of the present invention.

Requests to the DBM from one of the attached devices are issued from the requesting device. FIG. 5 provides a format for an example command word 500 according to an embodiment of the present invention. The command word 500 is used together with request signal 845 to issue requests to the DBM. The command word is 64 bits long and includes fields for a command 510, overwrite flag 530, burst size 540, and a logical address 550. The command is three bits in length and identifies one of read (3'b001) and write (3'b010) operations that are being requested by the device.

The overwrite flag 530 has different functions based on the command field 510. If the command is read, the overwrite flag is ignored by the DBM. If the command is write, the overwrite flag, if set, indicates DBM will not allocate a new page for this write request (this also indicates the write request is intended to overwrite data already existing in the packet buffer at the presented logical address. And, if in a write request and the overwrite flag is clear, the DBM will allocate a new physical page and save the physical page number into the location, indexed by the frame number and the logical page number, in memory map. The burst size field 540 indicates the intended number of bytes to be transferred to/from the DBM. The address field 550 maintains the 32-bit logical address of the data to be written/read from/to the DBM.

Figure 6:
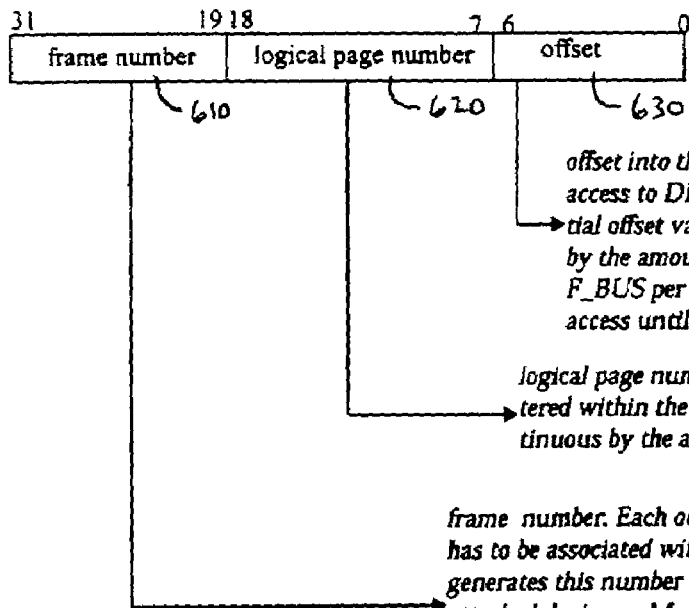
FIG. 6 is an illustration of a logical address format according to an embodiment of the present invention.

The address 550 is segmented into a frame number (bits[31:19]), a logical page number (bits[18:7]), and an offset into the logical page (bits[6:0]). Referring now to FIG. 6, the address 500, includes a frame number 610, logical page number 620, and offset 630 each corresponding to the memory structure in table 3 (above), and the memory map shown in FIG. 7 (discussed below). However, other arrangements of bits and formats may be used to communicate addressing and/or format of the commands.

The agent issues request to DBM with a predefined command word (command word 500, for example), including logical address (frame number, logical page number, and offset address), operation mode (read or write), overwrite flag, and burst size. In a write operation, the physical page allocation is made in association with the presented logical page number and is done dynamically. The physical page allocation is pre-fetched prior to the arbitration phase so there is no extra latency or overhead induced due to the physical page allocation. The arbitration phase is a decision made by the DBM as to which request is to be serviced when multiple requests are received by the DBM in a same time period. As mentioned above, the packet buffer (or memory pool) is a linear memory space and is viewed "logically" by the attached devices. And since the physical page number is allocated dynamically, this means that a packet data might be "physically" scattered around inside the packet buffer. The present invention includes a logical to physical address translation 480 for this memory architecture for both read and write operations that is transparent to the requesting device.

Since packet data may be scattered around in the DBM's packet buffer (memory pool 470, for example), the main function of the memory map is to implement a link-list like feature but without the computationally intensive processes involved with maintaining the list (next pointer maintenance, for example). In the read operation, the requesting device issues request to DBM with the read command word; DBM indexes out the targeted physical page (physical page associated with the read operation) out of the memory map by using the frame number and logical page number in the command word.

Figure 7:
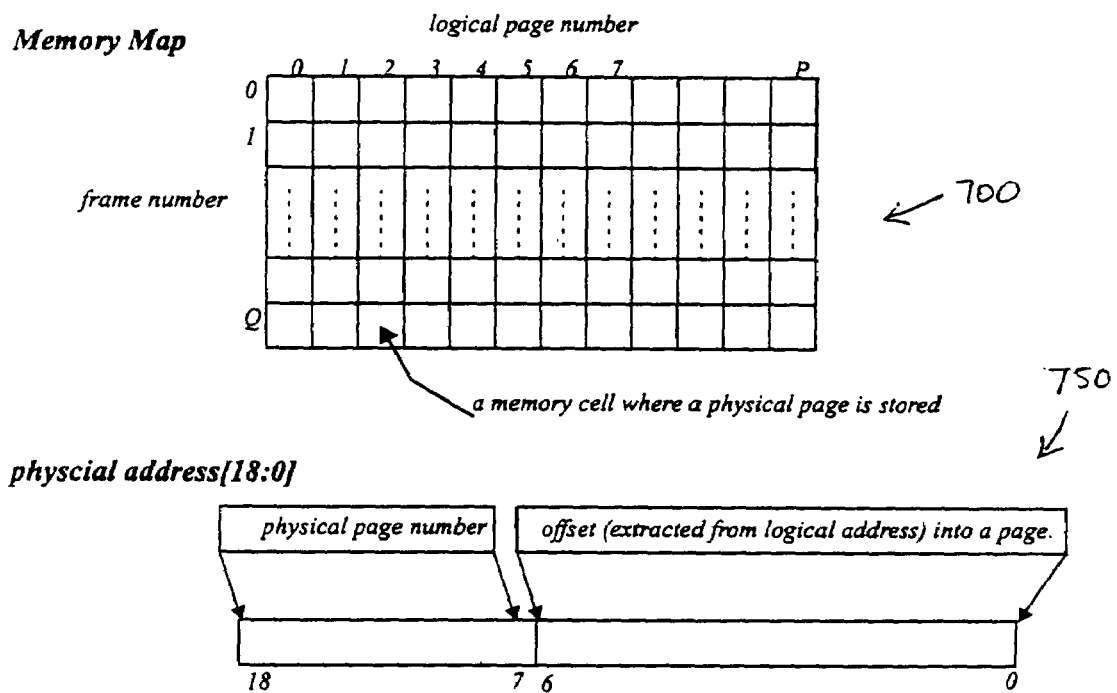
FIG. 7 is an illustration of a memory map and an address formation according to an embodiment of the present invention.

The free physical pages are stored in a free page queue 490. The allocated physical page number is then written into a cell of a memory map. For example, FIG. 7 is an illustration of a memory map 700 and an address formation 750 according to an embodiment of the present invention. In FIG. 7, the memory map is indexed by the combination of an assigned frame number and logical page number.

In this memory architecture, the agents can randomly access the packet data by specifying the intended frame number and the logical page number. The flexibility of this random access is particularly important in the applications such as IPSEC or priority handling. Take IPSEC as an example. In a high speed network environment (e.g. gigabit), the throughput of encryption or decryption becomes a bottleneck, typically 300 to 400 Mbps for triple DES. In a traditional FIFO memory architecture, the packet required en- or de-crypto becomes line of blocking, and tremendously degrades the overall performance. In contrast, DBM memory architecture with the flexibility of random access can support transfer out-of-order easily. The packet data to be read out and transmitted out is solely addressed by a frame number, not by the order of when data is written into the packet buffer. The packets not needing security processing can be sent out on wire (network) or to the host while the packets requiring encryption or decryption go through the crypto engines. Related information on IPSEC security may be determined by reference to Yang et al, U.S. application Ser. No. 09/723,418, entitled "HIGH PERFORMANCE IPSEC HARDWARE ACCELERATOR FOR PACKET CLASSIFICATION," 3Com Ref. 3374.DSD.US.P, filed, 27 Nov., 2000, the entire contents of which are incorporated herein by reference.

Figure 8:
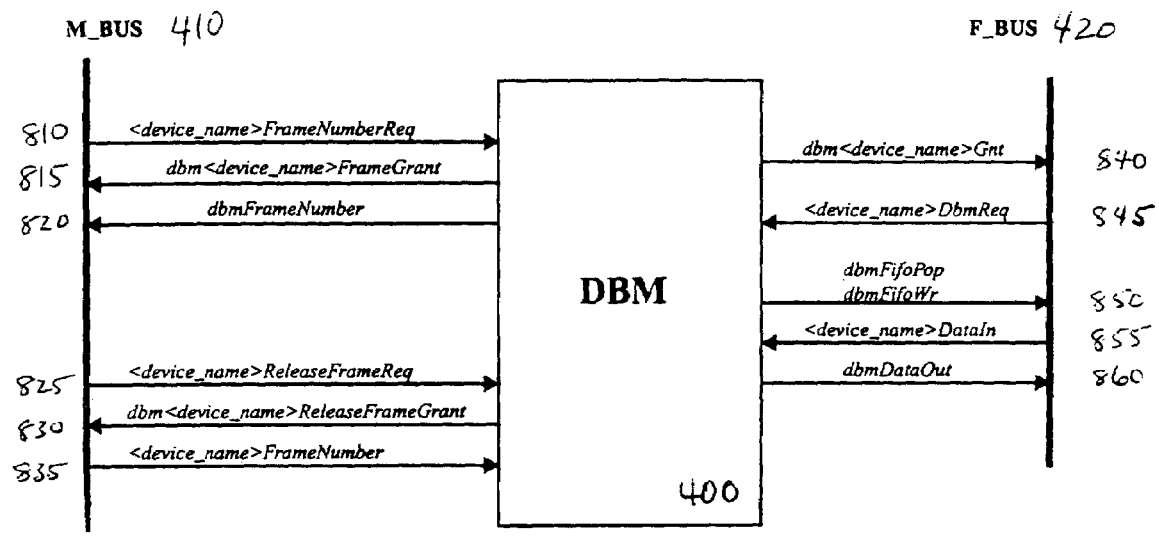
FIG. 8 is a block diagram of example interface signals between a Data Buffer Management (DBM) and attached devices according to an embodiment of the present invention.

FIG. 8 is a block diagram of example interface signals between a Data Buffer Management (DBM) and attached devices according to an embodiment of the present invention. On the M_BUS 410 side of the DBM 400 a set of input signals FrameNumberReq 810, ReleaseFrameReq 825, and FrameNumber 835 are input into the DBM 400. As discussed above, the FrameNumberReq 810 is a request fromm an attached device for a frame number to be used in a subsequent write to buffer. The ReleaseFrameReq 825 is a request to signal the DBM to release a frame back into the free frame number queue 490 so that it can be re-allocated later. The FrameNumber 835 is the frame number to be released by the attached device when asserting ReleaseFrameReq signal.

Also on the M_BUS 410 side of the DBM are a set of output signals dbm<device_name>FrameGrant 815, dbmFrameNumber 820, and dbm<device_name>ReleaseFrameGrant 830. An attached device is notified of a frame grant by the dbm<device_name>FrameGrant 815. The allocated frame number is contained in the dbmFrameNumber 820 bus. The dbm<device_name>ReleaseFrameGrant 830 is to acknowledge the requesting device 825 that wants to release a frame number 835.

On the F_BUS 420 side of the DBM 400, input signals include <device_name>DbmReq 845 which is a data transfer request signal, and <device_name>DataIn 855 which provides a signal for the data being written to the DBM (packet buffer 470, for example). Output signals include dbm<device_name>Gnt 840, dbmFifoPop and dbmFifoWr 850, and dbmDataOut 860. The dbm<device_name>Gnt 840 provides a data transfer request signal to an attached device indicating that everything is ready for data to be transferred across the F_BUS. The dbmFifoPop and dbmFifoWr 850 indicate that the DBM is accepting (POP) and outputing (Wr) data bytes. And, the dbmDataOut 860 carries the valid data word being output when the dbmFifoWr is asserted.

Each of the signals are carried to/from the DBM by separate buses. Other combinations of signals or bus arrangements may be made to provide the signaling needed to operate a DBM system according to the present invention.

Figure 9:
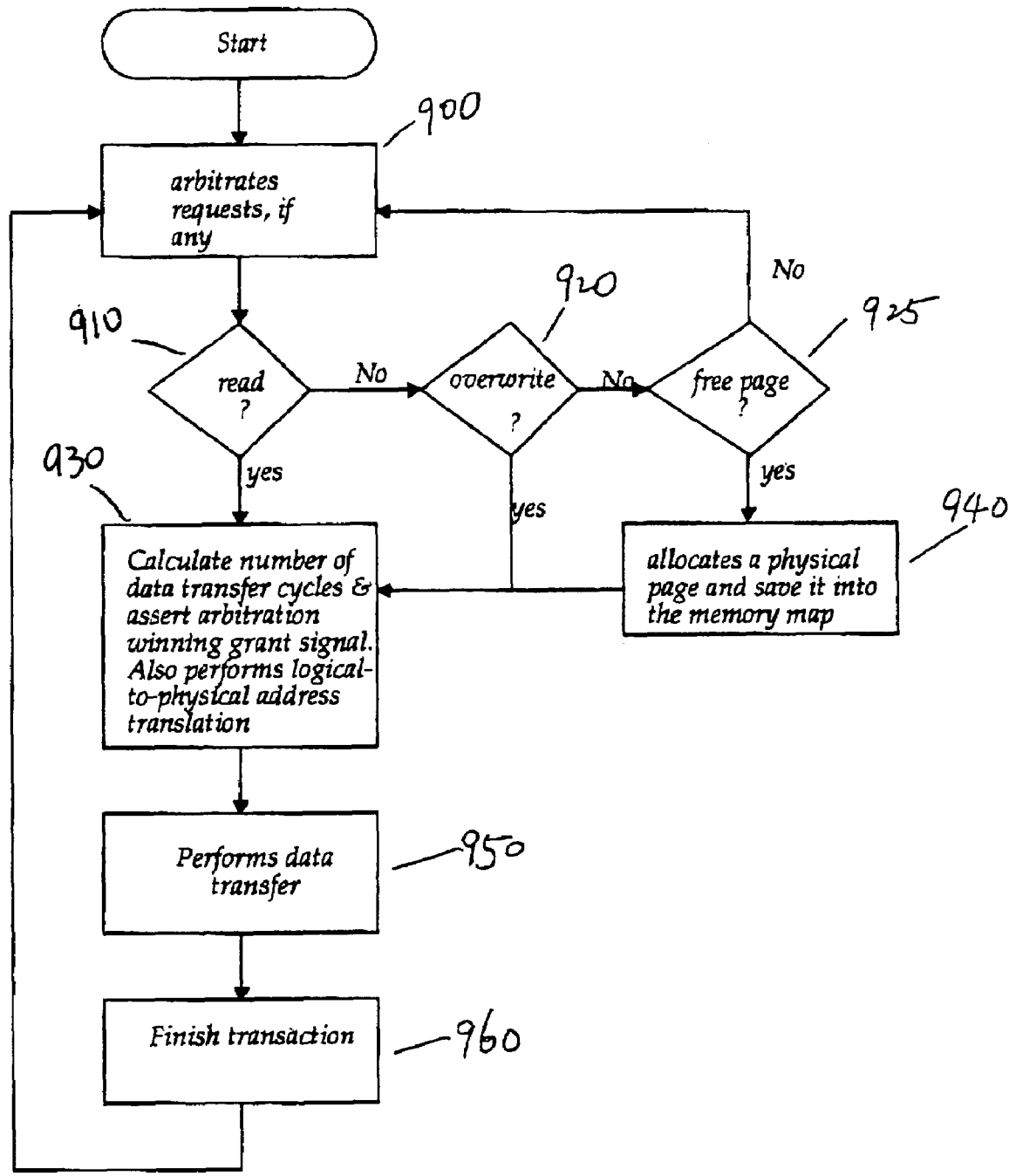
FIG. 9 is a flow chart of a write procedure according to an embodiment of the present invention.

FIG. 9 is a flow chart of a read or write procedure according to an embodiment of the present invention. Requests for read and write operations from the attached devices are arbitrated 900, and a free physical page number, if needed and available, is allocated from the free page queue pool and the allocated physical page is written into the memory map (Steps 920, 925 and 940). At step 930, a number of data transfer cycles needed for the winning arbitration is calculated and a grant signal to the arbitration winning device is asserted. Following the grant signal, the calculated number of data transfer cycles occur as the data is transferred between the arbitration winning device and the DBM (step 950). The transaction is completed by performing any needed cleanup, such as signaling end of transfer or transfer complete to the device (Step 960). The process continues (repeats) starting at step 900.

Figure 10:
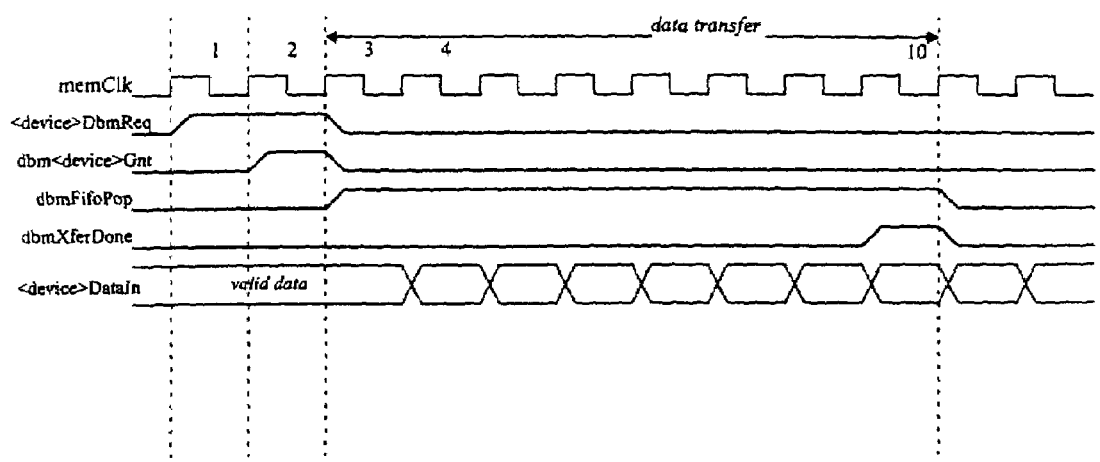
FIG. 10 is a timing diagram of an embodiment of a write procedure according to the present invention.
Figure 11:
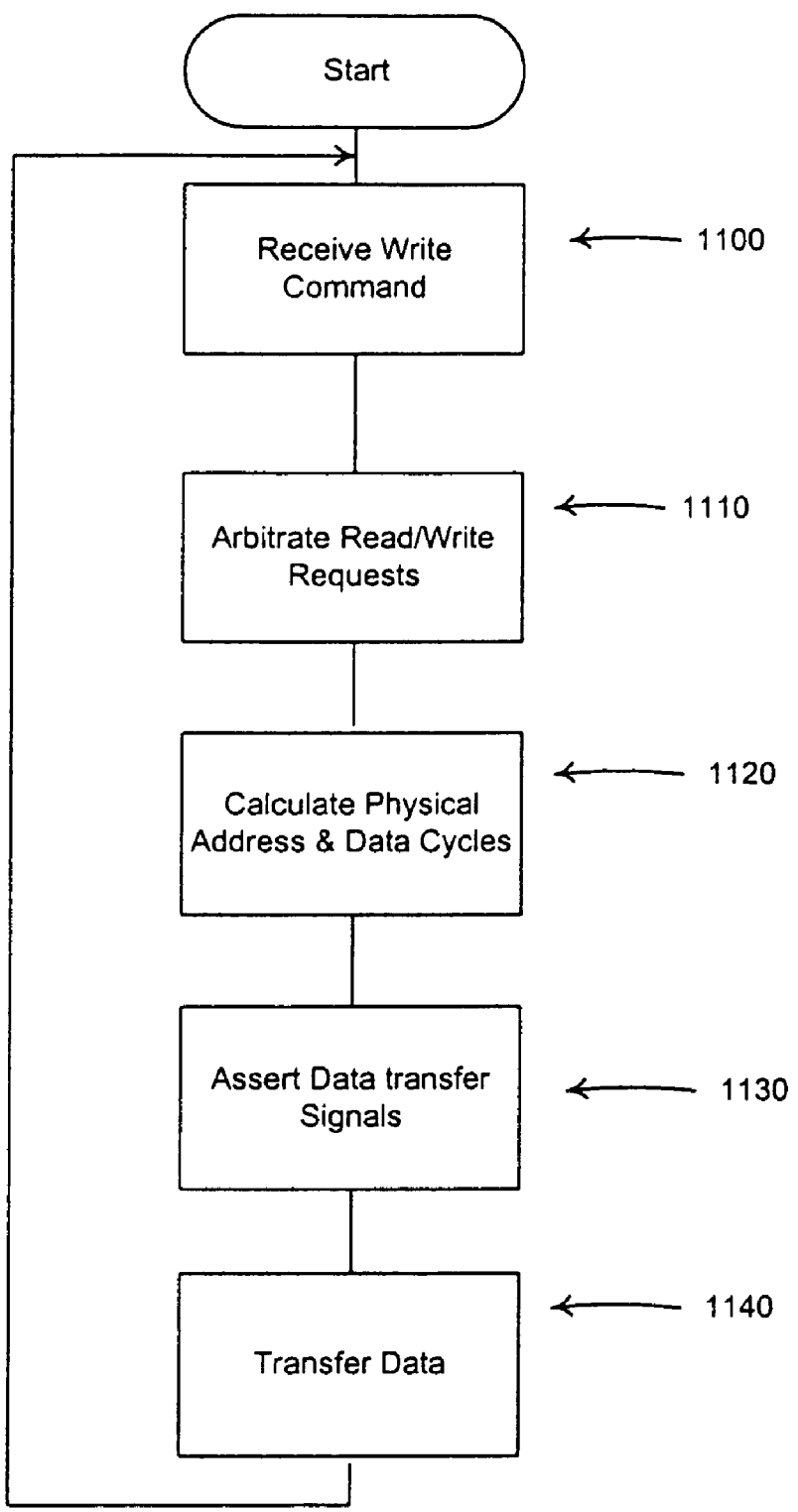
FIG. 11 is a flow chart of a read procedure according to an embodiment of the present invention.

FIG. 10 is a timing diagram of an embodiment of a write procedure according to the present invention. FIG. 10 is described in the following 7 steps:

1. Device_x always pre-requests a frame number from DBM for later use. It does so by asserting its frame number request signal, <device_name>FrameNumberReq. It then waits for dbm<device_name>FrameGrant signal. Once detecting the assertion of the grant signal, it latches the frame number presented on the dbmFrameNumber bus.

2. If there is enough data in its local memory (FIFO) or end of packet is reached, device_x compiles the command word as defined in FIG. 2 and asserts its data transfer request signal, <device_name>DbmReq. It treats the memory as continuous space. As far as it is concerned, it just has to make sure that the burst length does not exceed 128, and should be equal to or less than (128-offset).

3. DBM control logic arbitrates among all requesting devices. If overflag in command word is clear, it also monitors if there is any available physical pages in the pool. If no more free physical page left, meaning packet data buffer is full, DBM will not assert grant signal back to the winner of current arbitration. If there is free physical page available, it asserts the grant signal, dbmDeviceXGnt, and writes the physical page number into the memory map (similar to memory allocation operation) indexed by the frame number and logical page number, both extracted from device_x's command word.

4. After asserting grant signal, DBM assumes bus-master functionality. During the grant cycle, it calculates how many data transfer cycles are needed by looking into the burst_length field in the command word.

5. DBM starts asserting dbmFifoPop signal. Only the device owning the bus can respond to this signal. Device_x will place the next data word onto its data bus when detecting assertion of dbmFifoPop.

6. At the last data transfer phase, DBM also asserts dbmXferDone to inform device_x that current request is complete. Refer to FIG. 7 for timing details.

7. If there is more data to be written into DBM for current frame, device_x repeats from step 2. If end of packet reached, it then transfers the frame number and the packet length to the intended consumer's frame queue and goes back to step 1.

Figure 12:
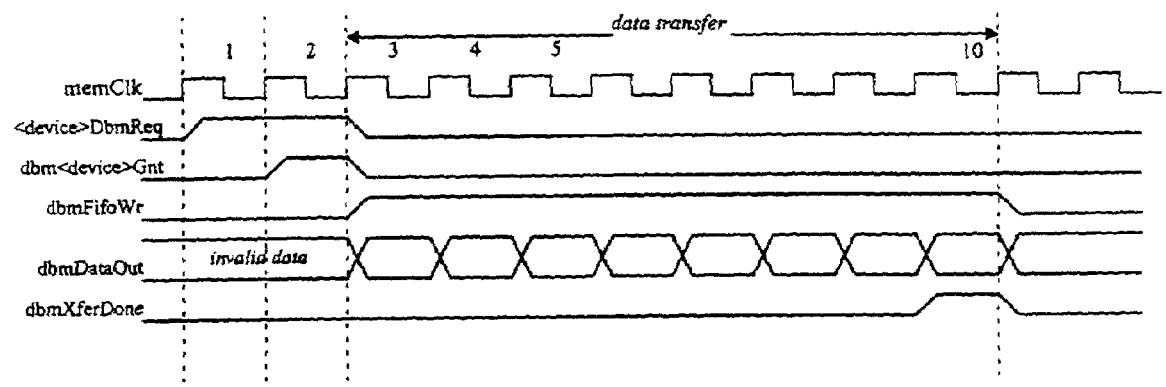
FIG. 12 is a timing diagram of an embodiment of a read procedure according to the present invention.

FIG. 12 is a timing diagram of an embodiment of a read procedure according to the present invention. FIG. 12 is described by the following 8 steps:

1. On detecting non-empty status of its frame queue, frame consumer device_y will retrieve the most top entry from its queue and process it. Each entry contains a frame number and its packet length.

2. Device_y compiles the command word as defined in FIG. 2 and asserts its data transfer request signal, <device_name>DbmReq. It treats the memory as continuous space. As far as it is concerned, it just has to make sure that the burst length does not exceed 128, and should be equal to or less than (128-offset).

3. DBM control logic arbitrates among all requesting devices. It asserts the grant signal, dbmDeviceYGnt.

4. During the grant cycle, DBM uses both frame number and logical page number in command word to index out the physical page number out of the memory map and forms the physical address. It also calculates how many data transfer cycles are needed by looking into the burst_length field in the command word. It then assumes bus-master functionality.

5. DBM starts asserting dbmFifoWr signal. Only the device owning the bus can respond to this signal. Device_y will store the current data word presented on dbmDataOut into its local FIFO memory when detecting the assertion of dbmFifoWr.

6. At the last data transfer phase, DBM also asserts dbmXferDone to inform device_y that current request is complete. Refer to FIG. 8 for timing details.

7. If there is more data to be read out of DBM for current frame, device_y repeats from step 2. If end of packet reached (the packet length is satisfied), it then releases the frame number and the packet length back to DBM's frame_release_queue and goes back to step 1.

8. On detecting non-empty status of frame_release_queue, DBM control logic extracts the frame number and the packet length from the topmost entry. By examining the packet length, it knows how many pages are used for this frame number. For example, if the packet length is 300 bytes, 3 pages are previously allocated for this packet and logical page numbers are 0, 1, and 2. The control logic then uses the frame number as the row address and logical page number as column address to retrieve the physical page number out of the memory map and put the physical page number back to the pool so the memory space can be re-used. This is similar to memory de-allocation. Finally, it places the frame number back to the pool for recycle.

As discussed above, the present invention provides great flexibility in, among other things, random access to the DBM buffer. These advantages are ideal for IPSEC environment where heavy computation loads are placed on certain (IPSEC) packets that may be received by the device. As another example of an advantage of the present invention, consider a networking environment where a received packet may be corrupted due to a CRC error. In most available systems, the packet having a bad packet (failing a CRC), is not discarded from the queue, FIFO, or other memory device until it is its turn to be further processed. By staying in the memory, the bad packet consumes valuable on-chip memory space that can be utilized for other operations. However, when using a DBM according to the present invention, even if the bad packet is not detected until the end of the packet after many data transfers have already been performed into the DBM packet buffer, if the receive_data_dma (the attached device that received the bad packet) can detect a bad packet, then the receive_data_dma can immediately release (see release command above) the bad packet from the DBM data buffer, freeing that memory space for other operations.

The present invention may be conveniently implemented using a conventional general purpose or a specialized digital computer or microprocessor programmed according to the teachings of the present disclosure, as will be apparent to those skilled in the computer art.

Appropriate software coding can readily be prepared by skilled programmers based on the teachings of the present disclosure, as will be apparent to those skilled in the software art. The invention may also be implemented by the preparation of application specific integrated circuits or by interconnecting an appropriate network of conventional component circuits, as will be readily apparent to those skilled in the art.

The present invention includes a computer program product which is a storage medium (media) having instructions stored thereon/in which can be used to control, or cause, a computer to perform any of the processes of the present invention. The storage medium can include, but is not limited to, any type of disk including floppy disks, mini disks (MD's), optical discs, DVD, CD-ROMS, micro-drive, and magneto-optical disks, ROMs, RAMs, EPROMs, EEPROMs, DRAMs, VRAMs, flash memory devices (including flash cards), magnetic or optical cards, nanosystems (including molecular memory ICs), RAID devices, remote data storage/archive/warehousing, or any type of media or device suitable for storing instructions and/or data.

Stored on any one of the computer readable medium (media), the present invention includes software for controlling both the hardware of the general purpose/specialized computer or microprocessor, and for enabling the computer or microprocessor to interact with a human user or other mechanism utilizing the results of the present invention. Such software may include, but is not limited to, device drivers, operating systems, and user applications. Ultimately, such computer readable media further includes software for performing the present invention, as described above.

Included in the programming (software) of the general/specialized computer or microprocessor are software modules for implementing the teachings of the present invention, including, but not limited to, allocating memory, maintaining a memory map to allocated memory, storing data in physical memory pointed to by the memory map (buffering data), randomly accessing buffered data, signaling data transfers, forwarding buffered data to service devices (crypto/de-crypto engines, for example) and/or forwarding the buffered data to a host or an attached device, and the display, storage, or communication of results according to the processes of the present invention.

Obviously, numerous modifications and variations of the present invention are possible in light of the above teachings. It is therefore to be understood that within the scope of the appended claims, the invention may be practiced otherwise than as specifically described herein.

What is claimed and desired to be secured by Letters Patent of the United States is:

1. A buffer memory device, comprising:
    a packet buffer divided into a set of numbered physical pages;
    a two-dimensional memory map, indexed by frame number as row and logical page number as column, configured as logical storage locations of said buffer memory device, each logical storage location stores a physical page number of said packet buffer; and
    a control device having,
    an interface to at least one attached device configured to communicate a read or write protocol between the buffer memory and the attached devices, and communicate data written/read to/from the attached devices;
    an arbitrator configured to arbitrate between requests of the attached devices; and
    a store retrieval mechanism configured to store data written to the buffer memory by a granted write operation of an attached device and read data from the buffer memory according to a granted read operation of an attached device;
    wherein said store/retrieval mechanism stores and retrieves data to/from a physical memory address in said packet buffer stored at a logical address in said memory map.

2. The buffer memory device according to claim 1, wherein said store/retrieval mechanism accepts variable data byte transfers up to a max transfer size.

3. The buffer memory device according to claim 2, wherein said max transfer size is 128 bytes.

4. The buffer memory device according to claim 1, wherein said physical pages are 128 bytes.

5. The buffer memory device according to claim 1, wherein:
    each of said logical storage locations comprise a combination of a logical page number and a frame number, each combination of logical page number and frame number identifying a starting position of a physical page of said memory pool.

6. The buffer memory device according to claim 1, wherein:
    said interface comprises,
    an M bus configured to accept memory requests from the attached devices and send arbitration awards to the attached devices; and
    an F bus configured to communicate data bytes to/from the attached devices.

7. The buffer memory device according to claim 1, wherein said control device further comprises an allocator configured to allocate physical pages from said free physical page queue for storing data writes to said buffer memory; and
    the allocation of said physical pages is pipelined with the arbitration of requests between the attached devices.

8. The buffer memory device according to claim 6, wherein said memory requests comprise:
    a command word;
    an overwrite flag;
    a burst size; and
    a 32-bit logical address.

9. The buffer memory device according to claim 8, wherein said command word comprises one of read and write.

10. The buffer memory device according to claim 8, wherein said overwrite flag, when said command word is set to write, comprises a flag that identifies whether the current memory request should be allocated a new physical page, or existing data in the buffer memory should be overwritten.

11. The buffer memory according to claim 8, wherein said burst size indicates a number of bytes to be transferred to/from the buffer memory.

12. The buffer memory according to claim 8, wherein said logical address identifies an address of the page to be accessed and an offset into the page to be accessed.

13. The buffer memory according to claim 8, wherein:
    said logical address comprises a frame number, a logical page number, and an offset into the page.

14. The buffer memory according to claim 8, wherein:
    said burst size identifies a number of data bytes to be transferred between the buffer memory and the attached device.

15. A method of writing to a data buffer comprising a packet buffer divided into a set of numbered physical pages, a two-dimensional memory map, indexed by frame number as row and logical page number as column, configured as logical storage locations of said buffer memory device, each logical storage location stores a physical page number of said packet buffer, and an interface to at least one attached device, comprising the steps of:
    in a first clock cycle, awarding an arbitration between requests of the attached devices to the first attached device, and allocating a physical page from said memory pool;

in a second clock cycle, saving the allocated physical page in the assigned logical address location of said memory map, said assigned logical location identified by the request of the first attached device, and asserting a grant signal to the first attached device; and in a transfer set of clock cycles, accepting data from the first attached device to the data buffer.

16. The method according to claim 15, further comprising the step of:

in a final clock cycle, asserting a transfer complete signal to the first attached device.

17. The method according to claim 15, wherein:

said method is embodied in a set of computer instructions stored on a computer readable media;

said computer instructions, when loaded into a computer, cause the computer to perform the steps of said method.

18. The method according to claim 17, wherein said computer instruction are compiled computer instructions stored as an executable program on said computer readable media.

19. A method of reading from a data buffer comprising a packet buffer divided into a set of numbered physical pages, a two-dimensional memory map, indexed by frame number as row and logical page number as column, configured as logical storage locations of said buffer memory device, each logical storage location stores a physical page number of said packet buffer, and an interface to at least one attached device, comprising the steps of:

arbitrating among command words from the attached devices;

indexing out the physical page number by combining frame number and logical page number;

translating a logical address to a physical address of a read command word that has been successfully arbitrated;

reading data bytes from the physical address, and sending the read data bytes to the attached device whose command word was successfully arbitrated.

20. The method according to claim 19, wherein:

said logical address of the read command word that has been successfully arbitrated includes a frame number, page number and an offset, said offset was embedded into the successfully arbitrated read command and indicates an offset in number of bytes into the logical page that the read is to start.

21. The method according to claim 20, wherein said read command also includes a burst size indicating a number of bytes to be read.

22. The method according to claim 19, wherein:

said method is embodied in a set of computer instructions stored on a computer readable media;

said computer instructions, when loaded into a computer, cause the computer to perform the steps of said method.

23. The method according to claim 22, wherein said computer instruction are compiled computer instructions stored as an executable program on said computer readable media.

24. In a network device that receives packets from a network and transfers the packets to a host device, said host device including a DBM buffer device for receiving the data packets, a method of receiving data packets comprising the steps of:

transferring data packets into the DBM buffer device;

receiving status signals from a transferring device regarding the status of the transferred data packets; and releasing any packets from the DBM buffer device that are indicated by the status signals as being corrupted;

wherein:

said DBM buffer device comprises, a memory pool divided into a set of numbered physical pages, a two-dimensional memory map, indexed by frame number as row and logical page number as column, configured as logical storage locations of said buffer memory device, each logical storage location stores a physical page number of said packet buffer, and a control device having, an interface to at least one attached device configured to, communicate a read write protocol between the buffer memory and the attached devices, and communicate data written/read to/from the attached devices, an arbitrator configured to arbitrate between requests of the attached devices, and a store retrieval mechanism configured to store data written to the buffer memory by a granted write operation of an attached device and read data from the buffer memory according to a granted read operation of an attached devices said store/retrieval mechanism stores and retrieves data to/from a physical memory address in said packet buffer stored at a logical address in said memory map;

said store/retrieval mechanism accepts variable data byte transfers up to a max transfer size;

each of said logical storage locations comprise a combination of a logical page number and a frame number, each combination of logical page number and frame number identifying a starting position of a physical page of said packet buffer;

said interface comprises, an M bus configured to accept frame number requests/releases from the attached devices and send arbitration awards to the attached devices, and an F bus configured to accept requests from the attached devices and send arbitration awards to the attached devices and communicate data bytes to/from the attached devices;

said control device further comprises an allocator configured to allocate physical pages from said free physical queue pool for storing data writes to said buffer memory, and the allocation of said physical pages is pipelined with the arbitration of requests between the attached devices;

said memory requests comprise:

a command word, including a command, an overwrite flag, a burst size, and a 32-bit logical address;

said overwrite flag, when said command word is set to write, comprises a flag that identifies whether the current memory request should be allocated a new physical page, or existing data in the buffer memory should be overwritten;

said burst size indicates a number of bytes to be transferred to/from the buffer memory; and said logical address identifies an address of the page to be written and an offset into the page to be written.

* * * * *